United States Patent [19]

Fahey

[11] 4,208,304

[45] Jun. 17, 1980

[54] CATALYST SYSTEM FOR PRODUCING ETHYLENE POLYMERS

[75] Inventor: Darryl R. Fahey, Bartlesville, Okla.

[73] Assignee: Phillips Petroleum Company, Bartlesville, Okla.

[21] Appl. No.: 907,471

[22] Filed: May 19, 1978

[51] Int. Cl.$^2$ .............................. C08F 4/64; C08F 4/68
[52] U.S. Cl. ................................ 252/429 C; 526/159; 526/169
[58] Field of Search ................................... 252/429 C

[56] References Cited

U.S. PATENT DOCUMENTS

| | | | |
|---|---|---|---|
| 3,218,266 | 11/1965 | Ludlum | 252/429 C |
| 3,308,112 | 3/1967 | Ludlum | 252/429 C X |
| 3,707,530 | 12/1972 | Calcagno et al. | 252/429 C X |
| 3,766,158 | 10/1973 | Yamaguchi et al. | 252/429 C X |
| 3,769,233 | 10/1973 | Hermans et al. | 252/429 C X |

*Primary Examiner*—Patrick Garvin

[57] ABSTRACT

A catalyst for producing ethylene polymers in which a first component composed of titanium, vanadium, halogen, and OR groups, wherein R is selected from among alkyl, cycloalkyl, aryl, acyl, and combinations thereof, is combined with an organometallic compound. A method for producing a catalyst system in which an organoaluminum compound component is contacted with a component composition produced by reacting a mixture of titanium and vanadium compounds with an organometallic compound to form a product mixture which is then contacted with titanium tetrachloride. A method for producing polymers of ethylene by contacting ethylene with a catalyst system produced as above under conditions suitable for polymerization.

14 Claims, No Drawings

CATALYST SYSTEM FOR PRODUCING ETHYLENE POLYMERS

BACKGROUND OF THE INVENTION

This invention relates to the production of polymers of ethylene. In one of its aspects this invention relates to catalyst systems suitable for producing polymers of ethylene. In another of its aspects, this invention relates to the preparation of such catalyst systems.

A catalyst system for the production of polymers of olefins that can be demonstrated to yield increased productivity of polymer as compared to other catalyst systems known in the art is of wide interest. Since it is well-known that new combinations of known catalysts or a different method for treating a catalyst composition can produce surprising results in catalyst activity or productivity, recombination of catalyst ingredients and novel treatment methods are constantly being initiated. As a result of such an effort, a new and useful catalyst system for the production of ethylene polymers has been discovered.

It is an object of this invention to provide a catalyst system for the production of ethylene polymers. It is another object of this invention to provide a method for preparing a catalyst system for the production of ethylene polymers. It is still another object of this invention to provide a method for producing ethylene polymers.

Other aspects, objects, and the various advantages of this invention will become apparent upon reading this specification and the attached claims.

STATEMENT OF THE INVENTION

A catalyst is provided that is useful in conjunction with an organoaluminum compound for producing ethylene polymers. The catalyst is a composition of titanium, vanadium, halogen, and OR groups, wherein R is selected from among alkyl, cycloalkyl, aryl, acyl, and combinations thereof, that is prepared by sequentially treating a mixture of titanium and vanadium compounds with (1) an organometallic compound and (2) titanium tetrachloride.

In one embodiment of the invention, a method is provided for producing a catalyst useful in conjunction with an organoaluminum compound for producing ethylene polymers. The method comprises: reacting a mixture of titanium and vanadium compounds with an organometallic compound to form a product mixture which is then contacted with titanium tetrachloride to produce a reaction product.

In further embodiments of the invention, the catalysts as described above are contacted with ethylene in the presence of an organoaluminum compound under conditions suitable for polymerization to produce polymers of ethylene.

A catalyst system comprising a mixture of titanium and vanadium compounds treated sequentially with an organometal compound and a titanium tetrahalide to form component A, and an organoaluminum compound designated as component B, is used to produce ethylene polymers according to this invention. Hydrogen can be present in the reactor during polymerization as is known in the art to regulate the molecular weight of the polymer. The resinous polymers formed are normally solid materials which can be readily converted into useful articles such as film, fibers, pipe, containers, and the like, by employing conventional plastics fabrication equipment.

The titanium compounds used in preparing component A are described by the formula $Ti(OR)_n X_{4-n}$ in which R is a selected from among alkyl, cycloalkyl, aryl, acyl groups and combinations thereof such as alkaryl. Each group can contain from 1 to about 20 carbon atoms per molecule. The subscript n designates 0,1,2,3 or 4 and X is bromide, chloride, or iodide, more usually bromide or chloride. Exemplary compounds include titanium tetraacetate, titanium tetramethoxide, titanium tetraethoxide, titanium tetraeicosyloxide, titanium tetracyclohexyloxide, titanium tetrabenzyloxide, titanium trimethoxidebutoxide, titanium ethoxytrichloride, titanium dibutoxidedioctadecyloxide, titanium diisopropoxydibromide, titanium phenoxytrichloride, titanium tri-o-xylenyloxychloride, titanium tetrabromide, titanium tetrachloride and titanium tetraiodide. A titanium alkoxide, particularly titanium tetraethoxide, is presently preferred.

The vanadium compounds used in preparing component A can be $VX_4$ or have the general formula $VO(OR')_m X_{3-m}$ in which R' is an alkyl group containing from 1 to about 20 carbon atoms, m is 0 to 3 and X is as described before. Representative compounds include vanadium tetrachloride, trimethyl vanadate, triethyl vanadate, tridodecyl vanadate, trieicosyl vanadate, diethoxy vanadium chloride, n-butoxy vanadium dibromide, vanadium oxytribromide and vanadium oxytrichloride. Vanadium oxytrichloride is presently preferred.

Although an effective catalyst can be formed without the presence of OR groups, it is necessary that a combination of titanium, vanadium, —X and —OR groups be present in order to achieve the best results. Thus, for example, a titanium alkoxide can be admixed with a vanadium oxytrihalide or a titanium tetrahalide can be admixed with a trialkyl vanadate. A presently preferred combination consists of titanium tetraethoxide and vanadium oxytrichloride.

The mole ratio of vanadium compound to titanium compound can range from about 0.1:1 to about 10:1, more preferably from about 0.25:1 to about 2:1 and even more preferably about 1:1.

Step 1 in forming component A is carried out by reacting the mixture of titanium and vanadium compounds with an organometallic compound of Group I–III of the Periodic Table of elements, *Handbook of Chemistry and Physics,* Chemical Rubber Company, 54th edition, 1973, page B3, and, in particular, with an organoaluminum compound selected from among alkylaluminum alkoxides, dialkylaluminum halides, alkylaluminum dihalides and mixtures thereof including alkylaluminum sesquihalides. The number of carbon atoms in each alkyl group can range from 1 to about 20. Exemplary compounds include dimethylaluminum bromide, diethylaluminum chloride, dioctylaluminum iodide, dieicosylaluminum chloride, ethylaluminum dichloride, dodecylaluminum dibromide, dioctadecylaluminum iodide, ethylaluminum sesquichloride, isobutylaluminum sesquibromide, diethylaluminum ethoxide, and the like. A presently preferred compound is ethylaluminum sesquichloride.

The mole ratio of organometallic compound to the mixture of titanium plus vanadium compounds can be varied. However, it is preferred that the gram-atom ratio of aluminum to titanium plus vanadium range frm about 0.5:1 to about 10:1, more preferably from about 0.7:1 to about 3:1.

The titanium and vanadium compounds are preferably admixed prior to their reaction with the organometallic compound. Although the compounds can be admixed neat, if liquids or if one is a liquid, this operation can be performed in a dry hydrocarbon diluent. Suitable hydrocarbon diluents include paraffins such as pentane, n-hexane, and the like; cycloparaffins such as cyclopentane, methylcyclohexane and the like; aromatic hydrocarbons such as benzene, toluene and the like; ethers such as diethyl ether, tetrahydrofuran, and the like; or mixtures thereof. Preferably, the admixture should age at least about two hours and even more preferably several days before the reaction is performed. A temperature for the reaction can range from about $-30°$ to about 150° C. and usually is in the range from about 0° to about 50° C., utilizing cooling as required to maintain the desired temperature. A reaction time ranging from about 0.5 to about 5 hours and generally from about 2 to about 4 hours is employed in preparing samples for bench scale use. Following the reaction, the colored precipitate is filtered off, washed with dry diluent, dried in a stream of dry, non-reactive gas such as nitrogen, argon, etc., or by evaporation and finally stored in a dry box in an inert atmosphere until used.

Order of addition of the reagents used in the reaction is usually by slow addition of the organometallic compound to the mixture of titanium and vanadium compounds. Good results in terms of polymer productivity are also realized by reverse addition of reagents. However, the bulk densities of polymers prepared when using catalysts produced by the latter method tend to be lower than those prepared by the first described preparation technique.

Step 2 in forming component A is carried out by contacting the product of step one with $TiCl_4$ at a temperature sufficient to provide a reaction. The reaction temperature generally ranges from about 10° to about 150° C. More preferred is a temperature range from about 20° to about 120° C. A weight ratio of $TiCl_4$ to step 1 product ranging from about 10:1 to about 0.1:1, more preferably from about 7:1 to about 0.25:1 is used. Generally, a hydrocarbon diluent, e.g. n-hexane or n-heptane, is also used in amounts ranging from about 2 to about 20 parts by weight per weight of component A precursor to facilitate the treating process. Treatment time can vary from about 0.1 to about 10 hours, more preferably from about 0.5 to about 6 hours. Following the treatment, component A is filtered off, washed with fresh portions of dry diluent, and dried overnight by evaporation of solvent in a dry box. It is within the scope of the invention to repeat the $TiCl_4$ treatment two or more times.

Component B of the catalyst system is an organoaluminum compound of the formula $AlR''_aX'_{3-a}$ where $R''$ represents hydrogen or an alkyl or aryl group containing from 1 to about 20 carbon atoms, $X'$ is bromine, chlorine or iodine or an alkoxy group containing from 1 to about 12 carbon atoms and a is an integer of 1 to 3. When $X'$ is alkoxy, a is 2. Exemplary compounds include trihydrocarbyl aluminum compounds such as trimethylaluminum, triethylaluminum, tridodecylaluminum, trieicosylaluminum, triphenylaluminum, dihydrocarbylaluminum halides such as diethylaluminum chloride, dibutylaluminum bromide; hydrocarbylaluminum dihalides such as methylaluminum dichloride, isopropylaluminum dibromide; hydrocarbylaluminum alkoxides such as dimethylaluminum ethoxide, didodecylaluminum dodecyloxide; and hydrocarbylaluminum sesquihalides such as ethylaluminum sesquichloride. Presently preferred are trialkylaluminum compounds, particularly triethylaluminum.

The molar ratio of component B to component A ranges from about 1:1 to about 1500:1, preferably about 2:1 to about 1000:1, in terms of $Al/(Ti+V)$.

The polymerization process used for producing ethylene polymers, according to this invention, can be any of the well-known processes including batch and continuous processes. As an example of a batch process, a stirred autoclave can be prepared by first purging with nitrogen and then with isobutane. A cocatalyst solution containing an organoaluminum halide and then a catalyst produced as set out above are introduced into the reactor through an entry port under an isobutane purge. The port is closed and hydrogen, if any, and isobutane are added. The autoclave is then heated to the desired reaction temperature in the range of about 50° C. to about 120° C. and the ethylene is then introduced and maintained at a partial pressure in the range of about 0.5 to about 5.0 MPa. At the end of a designated reaction time, usually about 0.5 to about 5 hours, the ethylene addition is terminated and unreacted ethylene and isobutane are vented. The reactor is then opened and the polyethylene product is collected as a free-flowing white solid. The polymeric product is air dried.

In a continuous process, a suitable reactor such as a loop reactor is continuously charged with suitable quantities of solvent or diluent, catalyst, cocatalyst, ethylene, hydrogen (if any), and comonomer (if any). Reactor product is continuously withdrawn and solid polymer recovered from it by suitable means such as by flashing.

EXAMPLE I

Preparation of a typical catalyst component A is performed as follows: In a dry box, 45.64 g (0.20 mole) of $Ti(OC_2H_5)_4$ and 34.66 g (0.20 mole of $VOCl_3$ were mixed together yielding a red liquid. After standing about two weeks, 40.14 g (0.10 mole) of the $Ti(OC_2H_5)_4 \cdot VOCl_3$ mixture was charged to a container along with 100 ml of dry n-hexane. The container was capped, removed from the dry box, placed in an ice bath and contents agitated while 135 ml of 25 wt. % ethylaluminum sesquichloride (EASC) in dry n-heptane, equivalent to 0.108 mole organoaluminum compound, was added over a 2 hour period. Thus, the mole ratio of EASC to titanium-vanadium compound mixture was about 1.1:1. Following this operation, the container was tumbled in a 30° C. bath for 17 hours, taken into a dry box, decapped, contents filtered and the brown colored solid washed with several portions of dry n-hexane. The resulting product was allowed to dry for several days by evaporation of the solvent in the dry box. A portion of the step one solid was reserved for a subsequent polymerization test. For convenience the solid product from step one is referred to in the tables as S-1.

Individual portions of the step one product were then treated with a mixture of titanium tetrachloride and dry n-hexane or n-heptane for several hours. The step two products were isolated by filtering, washed with several portions of dry n-hexane and dried overnight by evaporation of the solvent as the products were stored in the dry box.

Step two treating conditions are presented in Table 1A. In each instance, 1.00 g of step one product was treated.

Ethylene was polymerized for one hour employing a reactor temperature of 80° C. and a nominal reactor pressure of about 1.9 MPa (275 psig). The partial pressure of ethylene was held constant at 100 psig (0.69 MPa). The results obtained are given in Table 1B.

Component B consisted of 3 ml triethylaluminum (TEA) contained as a 15 wt. % solution in dry n-heptane, giving a calculated amount of 2.76 mmoles TEA used in each run.

Table 1A

Treating S-1 Composition With $TiCl_4$

| Component A No. | $TiCl_4$ (g) | Wt. Ratio $TiCl_4$:S-1 | Hydrocarbon (name) | (ml) | Time (hrs) | Temp. °C. | |
|---|---|---|---|---|---|---|---|
| 1 | 0 | 0 | 0 | | 0 | 0 | Control |
| 2 | 0.25 | 0.25:1 | hexane | 10 | 2 | 25 | |
| 3 | 0.25 | 0.25:1 | hexane | 10 | 4 | 25 | |
| 4 | 0.25 | 0.25:1 | hexane | 20 | 2 | 68 | |
| 5 | 0.25 | 0.25:1 | hexane | 20 | 4 | 68 | |
| 6 | 0.25 | 0.25:1 | heptane | 20 | 2 | 100 | |
| 7 | 1.00 | 1:1 | hexane | 10 | 2 | 25 | |
| 8 | 1.00 | 1:1 | hexane | 10 | 4 | 25 | |
| 9 | 1.00 | 1:1 | hexane | 20 | 2 | 68 | |
| 10 | 1.00 | 1:1 | hexane | 20 | 4 | 68 | |
| 11 | 2.00 | 2:1 | hexane | 10 | 2 | 25 | |
| 12 | 2.00 | 2:1 | hexane | 10 | 4 | 25 | |
| 13 | 2.00 | 2:1 | hexane | 20 | 2 | 68 | |
| 14 | 2.00 | 2:1 | hexane | 20 | 4 | 68 | |
| 15 | 3.00 | 3:1 | hexane | 10 | 2 | 25 | |
| 16 | 3.00 | 3:1 | hexane | 10 | 4 | 25 | |
| 17 | 3.00 | 3:1 | hexane | 20 | 2 | 68 | |
| 18 | 3.00 | 3:1 | hexane | 20 | 4 | 68 | |
| 19 | 3.00 | 3:1 | heptane | 20 | 2 | 100 | |
| 20 | 5.00 | 5:1 | heptane | 20 | 2 | 100 | |

Table 1B

Ethylene Polymerization With Ti/V Catalysts

| Component A No. | Wt. Ratio $TiCl_4$:S-1 | Run No. | Component A g | Polymer Yield, g | Calculated Productivity g/g A | Polymer Bulk Density g/ml |
|---|---|---|---|---|---|---|
| 1[a] | 0 | 10 | 0.0190 | 120 | 6,300 | 0.36 |
| 2 | 0.25:1 | 11 | 0.0130 | 298 | 23,000 | nd[b] |
| 3 | 0.25:1 | 12 | 0.0150 | 531 | 35,000 | 0.38 |
| 4 | 0.25:1 | 13 | 0.0080 | 306 | 38,000 | 0.34 |
| 5 | 0.25:1 | 14 | 0.0124 | 460 | 37,000 | 0.36 |
| 6 | 0.25:1 | 15 | 0.0080 | 464 | 58,000 | nd |
| 7 | 1:1 | 16 | 0.0128 | 488 | 38,000 | 0.36 |
| 8 | 1:1 | 17 | 0.0098 | 341 | 35,000 | 0.34 |
| 9 | 1:1 | 18 | 0.0062 | 365 | 59,000 | nd |
| 10 | 1:1 | 19 | 0.0076 | 439 | 58,000 | 0.28 |
| 10 | 1:1 | 20 | 0.0052 | 203 | 39,000 | 0.26 |
| 11 | 2:1 | 21 | 0.0096 | 327 | 34,000 | nd |
| 12 | 2:1 | 22 | 0.0100 | 473 | 47,000 | 0.36 |
| 13 | 2:1 | 23 | 0.0073 | 415 | 57,000 | 0.26 |
| 13 | 2:1 | 24 | 0.0050 | 331 | 66,000 | 0.26 |
| 14 | 2:1 | 25 | 0.0057 | 407 | 71,000 | nd |
| 14 | 2:1 | 26 | 0.0043 | 293 | 68,000 | nd |
| 14 | 2:1 | 27 | 0.0056 | 410 | 73,000 | nd |
| 15 | 3:1 | 28 | 0.0078 | 311 | 40,000 | 0.32 |
| 16 | 3:1 | 29 | 0.0135 | 657 | 49,000 | 0.34 |
| 17 | 3:1 | 30 | 0.0023 | 196 | 85,000 | 0.22 |
| 18 | 3:1 | 31 | 0.0102 | 655 | 64,000[c] | 0.26 |
| 18 | 3:1 | 32 | 0.0050 | 308 | 62,000 | 0.24 |
| 18 | 3:1 | 33 | 0.0053 | 443 | 84,000 | 0.24 |
| 19 | 3:1 | 34 | 0.0068 | 542 | 80,000 | nd |
| 20 | 5:1 | 35 | 0.0069 | 589 | 85,000 | nd |

Notes:
[a] No $TiCl_4$ treatment, control run.
[b] nd means not determined.
[c] 1.5 hour run.

Inspection of the data presented in Tables 1A and 1B reveals that compositions prepared from 1 to 1 molar ratios of $Ti(OC_2H_5)_4$ and $VOCl_3$ reacted with EASC and post treated with $TiCl_4$ are active ethylene polymerization catalysts. Without such treatment the control catalyst for the series produce 6,300 grams polyethylene per gram catalyst component A per hour at 80° C. as the result in run 1 shows. The remaining runs are grouped to show the effects of $TiCl_4$ treatment in terms of wt. ratio $TiCl_4$:reacted Ti/V composition at several treatment conditions. In general, within each group, the most active catalysts result when the $TiCl_4$ treatment occurs at about 68° C. or 100° C. for 2-4 hours rather than a similar time at 25° C. The results also show, that a wt. ratio of $TiCl_4$ to S-1 composition of about 0.25:1 and even more preferably about 2:1 is desirable in the treating step to obtain highly active catalysts.

EXAMPLE II

The influence of the reducing agent employed in forming catalyst component A, the order of addition of reagents and the effect of $TiCl_4$ treatment is explored in this example.

Following the procedure described before, 22.82 g (0.10 mole) of $Ti(OC_2H_5)_4$ and 17.33 g (0.10 mole) of $VOCl_3$ were mixed together and stored in a dry box for at least 4 days before being used in the compositions described below.

Composition 1 was made by adding 25 mmoles of ethylaluminum dichloride (EADC, 1.65 molar in n-hexane) to a flask containing 10 mmoles of the Ti/V mixture and 10 ml n-hexane over about a 3/4 hour period at about room temperature. The mole ratio of EADC to Ti/V mixture was 2.5:1. After stirring 3 hours, the brown precipitate was filtered off, washed with n-hexane and dried overnight by evaporation of solvent in a dry box.

Composition 1T was made by stirring 0.50 g $TiCl_4$ with 0.87 g composition 1 (wt. ratio is 0.57:1) and 10 ml n-hexane for 3 hours at 25° C. The product was isolated, washed and dried as described before.

Composition 2 was made with the same amounts of reagents at 25° C. in a similar period of time as described in composition 1 except the Ti/V mixture was added to the EADC solution. It was isolated, washed and dried as before.

Composition 2T was made by stirring 0.50 g $TiCl_4$ and 1.04 g of composition 2 (wt. ratio is 0.48:1) and 10 ml n-hexane for 3 hours at room temperature. The product was isolated, washed and dried as before.

Composition 3 was made at 25° C. by adding 12 mmoles of EASC, 25 wt. % in n-heptane, to a flask containing 10 mmoles of the Ti/V mixture and 20 ml n-hexane over a period of about 1 hour. The mole ratio of EASC to Ti/V mixture was 1.2:1. The mixture was stirred overnight (about 15 hours). The product was isolated, washed and dried as before.

Composition 3T was made at 25° C. by stirring 0.50 g $TiCl_4$ with 0.86 g composition 3 (wt. ratio is 0.58:1) and 10 ml n-hexane for 3 hours. The product was isolated, washed and dried as before.

Composition 4 was made at 25° C. with the same amounts of reagents described in composition 3 except that the Ti/V mixture was added to the EASC solution and n-hexane in the flask in about ¾ hour. The mixture after stirring for 5 hours was isolated, washed and dried as before.

Composition 4T was made at 25° C. by stirring 0.50 g TiCl$_4$ with 0.62 g composition 4 (wt. ratio is 0.81:1) and 10 ml n-hexane for 3 hours. The product was isolated, washed and dried as before.

Composition 5 was made at 25° C. by adding 25 mmoles of diethylaluminum chloride (DEAC, 25 wt. % in n-hexane) to a flask containing 10 mmoles of the Ti/V mixture and 20 ml of n-hexane over a 1 hour period. The mole ratio of DEAC to Ti/V mixture was 2.5:1. Stirring was continued for 4 hours after which the product was isolated, washed and dried as before.

Composition 5T was made at 25° C. by stirring 0.50 g TiCl$_4$ with 0.81 g of composition 5 (wt. ratio is 0.62:1). The product was isolated, washed and dried as before.

Composition 6 was made at 25° C. by adding 10 mmoles of the Ti/V mixture to a flask containing 24.6 mmoles of the DEAC solution and 20 ml n-hexane over ¾ hour with stirring. Stirring was continued for 5 hours after which the product was isolated, washed and dried as before.

Composition 6T was made at 25° C. by stirring 0.50 g Ticl$_4$ with 0.70 g of composition 6 (wt. ratio is 0.71:1) for 3 hours. The product was isolated, washed and dried as before.

A portion of each catalyst composition was used in combination with 3 ml TEA solution, equivalent to 2.76 mmoles TEA, to polymerize ethylene as before at 80° C. in the absence of hydrogen. Each run was 1 hour in length unless specified otherwise. The conditions used and results obtained are given in Table 2. The nominal reactor pressure was 275 psig (1.9 MPa) with an ethylene partial pressure of 0.69 MPa.

Table 2

Ethylene Polymerization Results

| Component A Composition | | Run No. | Component A g | Step 1 Reducing Agent | Polymer Yield g | Calculated Productivity g/g A/hr | Remarks |
|---|---|---|---|---|---|---|---|
| No. | Wt. Ratio TiCl$_4$:S-1 | | | | | | |
| 1 | 0 | 33 | 0.0138 | EADC | 245 | 17,800 | control |
| 1T | 0.57:1 | 33A | 0.0144 | EADC | 475 | 33,000 | invention |
| 3 | 0 | 34 | 0.0230 | EASC | 256 | 11,100 | control |
| 3T | 0.58:1 | 34A | 0.0180 | EASC | 692 | 38,000 | invention |
| 3T | 0.58:1 | 34B | 0.0093 | EASC | 300 | 32,000 | invention |
| 5 | 0 | 35 | 0.0188 | DEAC | 157 | 7,000$^{(a)}$ | control |
| 5T | 0.62:1 | 35A | 0.0100 | DEAC | 189 | 19,000 | invention |
| 2 | 0 | 36 | 0.0091 | EADC | 119 | 14,000 | control |
| 2T | 0.48:1 | 36A | 0.0086 | EADC | 242 | 28,000 | invention |
| 4 | 0 | 37 | 0.0103 | EASC | 206 | 20,000 | control |
| 4T | 0.8:1 | 37A | 0.0095 | EASC | 537 | 57,000 | invention |
| 4T | 0.8:1 | 37B | 0.0105 | EASC | 410 | 39,000 | invention |
| 6 | 0 | 38 | 0.0235 | DEAC | 132 | 5,600 | control |
| 6T | 0.71:1 | 38A | 0.0107 | DEAC | 505 | 47,000 | invention |
| 6T | 0.71:1 | 38B | 0.0170 | DEAC | 727 | 43,000 | invention |
| 6T | 0.71:1 | 38C | 0.0097 | DEAC | 677 | 70,000$^{(b)}$ | invention |

Notes:
$^{(a)}$72 min. run yielded 8350 g, calc. for 60 min. gives 7000 g.
$^{(b)}$2 hour run.

The results given in Table 2 demonstrate that the titanium/vanadium mixture can be reacted with various alkylaluminum halide compounds to obtain solid products, which after treatment with TiCl$_4$, are active polymerization catalysts. The beneficial effects of the TiCl$_4$ treatment on catalyst activity are clearly shown in those run numbers followed by the letter A, B or C in comparison to the appropriate control run signified by a number only. The productivity values suggest that the most active component A is formed when EASC is used to react with the Ti/V mixture.

Reproducibility of productivity values in terms of grams of polymer per gram component A per hour obtained with the catalyst systems are shown in runs 34A and 34B in which an average productivity of 35,000 is obtained. Thus, the two runs deviate about ±8% from the average. Similarly for runs 38A and 38B an average productivity of 45,000 is obtained. The two runs deviate about ±5% from the average. In performing similar calculations for runs 37A and 37B, an average productivity of 48,000 is obtained. The two runs deviate about ±18% which is felt to be abnormally large since results of about ±10% or less are considered to be acceptable in bench scale runs. The reason for this is not known but might be accounted for by different poison levels in each run.

Run 38C is a 2 hour run. The results show the catalyst system to continue its activity for polymerizing ethylene beyond 1 hour. An average of productivity results for runs 38A and 38B show an average of 45,000 g polymer per g component A per hour. The same system is shown to produce 70,000 g polymer per g component A in 2 hours.

In summary, a high yield ethylene polymerization catalyst is disclosed which is prepared by reacting a Ti(OC$_2$H$_5$)$_4$·VOCl$_3$ mixture with an organoaluminum compound to form a solid which is then treated with Ticl$_4$ to produce an active catalyst. When the catalyst is used with TEA as cocatalyst to polymerize ethylene, polymer yields as high as 85,000 gram per gram catalyst (component A) per hour have been observed. At this productivity level, it is calculated that the resulting polymer would contain less than about 3 ppm titanium plus vanadium and less than about 5 ppm chloride ion. Such low levels of catalyst residues suggest it may not be necessary to attempt removing them from the polymer, thus providing a significant economic advantage.

EXAMPLE III

In a dry box containing a 100 ml flask equipped with a stir bar and a stopper was added 2.28 g (10 mmoles) of Ti(OC$_2$H$_5$)$_4$, 1.73 g (10 mmoles) VOCl$_3$ and 20 ml of dry n-hexane and the mixture was stirred 3 hours at room temperature. Then 12.5 ml of 25 wt. % EASC solution (10 mmoles EASC) was added over a 1 hour period while stirring and stirring was continued overnight (about 16 hours). The mixture was filtered, the precipitate washed with n-hexane and the product (G) dried overnight by evaporation of the solvent.

A 1.62 g portion of the product was stirred for 3 hours at room temperature with 0.50 g TiCl$_4$ and 10 ml of dry n-hexane. The weight ratio of TiCl$_4$ step 1 composition was 0.3:1. The resulting product (H) was filtered, washed with dry n-hexane and dried as above.

Each product was analyzed and the active metal contents determined. For convenience, each metal is given in terms of wt. %, calculated as the element.

| Sample | Wt. % | | | Mole Ratio |
|---|---|---|---|---|
| | Ti | V | Al | Ti/V |
| G | 9.4 | 10.9 | 5.3 | 0.87 |
| H | 10.8 | 11.1 | 4.2 | 0.98 |

The results indicate that not all of the starting titanium is recovered since the initial Ti/V mole ratio of 1:1 is decreased to 0.87:1 in composition G. When this composition is treated with TiCl$_4$ and excess TiCl$_4$ is removed by washing the results show that a composition is formed that has a Ti/V mole ratio of about 1:1.

When the TiCl$_4$ treatment entails higher treating temperatures and higher weight ratios of TiCl$_4$ to step 1 composition such as those described in Example I, the amount of TiCl$_4$ fixed onto the step 1 composition is increased somewhat. In general, the increased percentage of contained Ti ranges from about 1% to 10%. Concurrently, the V and Al percentages experience a decrease of about 1% to 4%.

Samples of G and H were used to polymerize ethylene for 1 hour at 80° C. in the manner described earlier. The amount of catalyst and cocatalyst used and the results obtained are shown below.

| Catalyst | | | | | | | |
|---|---|---|---|---|---|---|---|
| description | wt.g. | calculated mmoles Ti | V | Cocatalyst TEA mmoles | Calculated Mole Ratio Al/(Ti + V) | Polymer Yield g | Calculated Productivity g/g A |
| G | 0.0153 | 0.030 | 0.033 | 2.76 | 44:1 | 177 | 12,000 |
| H | 0.0200 | 0.045 | 0.044 | 2.76 | 31:1 | 610 | 31,000 |

The results clearly show in comparison to untreated catalyst that post treating a step 1 composition with TiCl$_4$ and using the recovered catalyst with a cocatalyst to polymerize ethylene results in almost a three-fold improvement in productivity based in g polymer per g catalyst component A per hour.

EXAMPLE IV

A reacted Ti/V composition was prepared as before by treating a 1:1 molar composition of Ti(OC$_2$H$_5$)$_4$-VOCl$_3$ (12.03 g, 30 mmoles) in 100 ml of dry n-hexane contained in a flask with 45 ml of 25 wt. % EASC in n-heptane (36 mmoles EASC) over a 45 minute period at 0° C. (ice bath). The flask was removed from the ice bath and the mixture was stirred overnight. The step 1 product was isolated, washed and dried in a dry box to yield a brown powder weighing 13.55 grams.

The 13.55 g step 1 product was added to 40 ml of dry n-hexane contained in a flask at room temperature and stirred while 2.0 g of TiCl$_4$ was added. Stirring was continued for 3 hours. The step 2 product was isolated, washed and dried as before to yield 14.18 g of a brown powdery solid. The TiCl$_4$-step one wt. ratio was 0.15:1.

The step 2 operation was performed in a dry box. This product is designated S-2.

In a dry box, 2.36 g of the step 2 product was charged to a flask along with 10 ml of dry n-hexane and 0.50 g of TiCl$_4$. The TiCl$_4$ to step 2 product weight ratio was 0.21:1. The mixture was stirred for 3 hours at room temperature and the product isolated, washed and dried to yield a brown powdery solid. Some of the product was lost during transfer to a vial, hence an accurate weight of the product was not obtained. However, 2.07 g of product was recovered. This product is designated as S-2+1.

Samples of the catalysts were tested for ethylene polymerization in the manner described before. Each test was performed at 80° C. for 1 hour using 3 ml of the same TEA solution. The results are given in Table III.

Table III

| | Ethylene Polymerization | | | |
|---|---|---|---|---|
| Run No. | Catalyst description | wt.g. | Polymer Yield g | Bulk Density g/cc | Catalyst Productivity g PE/g cat/hr |
| 1 | S-2 | 0.0103 | | nd | 24,100 |
| 2 | S-2 | 0.0067 | | nd | 22,200 |
| 3 | S-2 | 0.0096 | | nd | 22,100 |
| | | | | | 22,800 ave. |
| 4 | S-2+1 | 0.0074 | | 0.34 | 44,200 |
| 5 | S-2+1 | 0.0082 | | nd | 47,900 |
| 6 | S-2+1 | 0.0075 | | nd | 40,000 |
| | | | | | 44,000 ave. |

The productivity results show that a two-stage treatment of a step 1 product with TiCl$_4$ (runs 4–6) can substantially increase the polymerization activity of the catalyst compared to a single stage treatment (runs 1–3).

The results also suggest that if a single treatment of step 1 product with TiCl$_4$ yields a catalyst having relatively poor activity that the activity can be increased by one or more additional TiCl$_4$ treatments.

EXAMPLE V

A step 1 Ti/V composition was prepared by treating 60.21 g (0.15 moles) of a composition consisting of equal molar amounts of Ti(OC$_2$H$_5$)$_4$ and VOCl$_3$ with 225 ml of 25 wt. % EASC (0.2 mole) in the manner previously described. Eight such batches were prepared plus a lesser batch about ⅝ as big but using the same ratio of components. The step 1 compositions were isolated, washed and dried as before. Portions of the compositions were combined and mixed to yield 3 batches of the step 1 catalyst. One batch weighing 150 g was charged to a flask and contacted with 148 g of TiCl$_4$ and 300 ml of n-hexane and the stirred mixture was heated for 2 hours at 68°–70° C. After cooling to about 30°–35° C. the flask and contents were transferred to a dry box and solid product recovered by filtration, washing with n-hexane and drying about 2 days to obtain a brown powdery solid weighing 190.5 grams. The weight ratio of TiCl$_4$ to step 1 composition was 0.99:1. The other two batches weighing 150 g each were individually treated with 150 g TiCl$_4$ and 400 ml of n-hexane and reacted, isolated, washed and dried as in the first batch to obtain brown powdery solids weighing 185.5 grams for batch 2 and 185.6 grams for batch 3. All batches were then combined. A sample was partially analyzed and found to contain 15.7 wt. % Ti and 7.9 wt. % V. The aluminum and chloride components were not determined.

The final catalyst was prepared by mixing each 25 g portion of the step 2 catalyst with 100 g of dry, powdered polyethylene sieved through a 50 mesh (U.S. Sieve series) screen.

Ethylene and 1-hexene were copolymerized by contact with the polyethylene-diluted catalyst in a continuous process employing a 26 gal (98 l) loop reactor in the manner known in the art. Isobutane was used as diluent, triethylaluminum was used as cocatalyst and molecular hydrogen was used to adjust the molecular weight of the polymer.

At steady state conditions, the hourly feed rates were: isobutane, 7.9 gal (30 l); ethylene, 16.6 lbs (7.53 kg); 1-hexene, 2.37 lbs (1.08 kg); catalyst, 0.00047 lbs (0.21 g) and triethylaluminum cocatalyst, 0.001 lbs (0.45 g). The ethylene content in the reactor was calculated to be 7.0 mole %, the hydrogen content in the reactor was calculated to be 0.62 mole %. Reactor product was continuously withdrawn and the polyethylene was recovered by flashing away isobutane diluent and monomers. The copolymer was produced at the rate of 16.6 lbs/hr at a calculated productivity of 35,000 lbs copolymer per lb polyethylene diluted catalyst. The copolymer was found to have a density of 0.947 g/cc and a melt index of 2.5 (ASTM D 1238-65T, condition E).

I claim:

1. A catalyst useful in conjunction with an organoaluminum compound for producing ethylene polymers, said catalyst comprising a composition of titanium, vanadium, and halogen groups prepared by sequentially treating a mixture of titanium and vanadium compounds with (1) an organometallic compound and (2) titanium tetrachloride wherein said titanium compound is described by the formula Ti(OR)$_n$X$_{4-n}$ in which R is selected from among alkyl, cycloalkyl, aryl, and acyl groups and combinations thereof; each group can contain from 1 to about 20 carbon atoms per molecule; n designates 1, 2, 3, or 4; and X is bromide, chloride, or iodide and the vanadium compound is VX$_4$ or VO(OR')$_m$X$_{3-m}$ in which R' is an alkyl group containing from 1 to about 20 carbon atoms, m is 0 to 3 and X is bromide, chloride or iodide.

2. A catalyst of claim 1 wherein m is 1-3.

3. A catalyst of claim 1 wherein the organometallic compound is an organoaluminum compound selected from among dialkylaluminum halides, alkylaluminum dihalides, alkylaluminum alkoxides, and mixtures thereof.

4. A catalyst of claim 1 wherein said titanium compound is chosen from among a titanium tetraacetate, titanium tetramethoxide, titanium tetraethoxide, titanium tetraeicosyloxide, titanium tetracyclohexyloxide, titanium tetrabenzyloxide, titanium trimethoxidebutoxide, titanium ethoxytrichloride, titanium dibutoxidedioctadecyloxide, titanium diisopropoxydibromide, titanium phenoxytrichloride, and titanium tri-o-xylenyloxychloride, and said vanadium compound is chosen from among vanadium tetrachloride, trimethyl vanadate, triethyl vanadate, tridodecyl vanadate, trieicosyl vanadate, diethoxy vanadium chloride, n-butoxy vanadium dibromide, vanadium oxytribromide and vanadium oxytrichloride.

5. A catalyst of claim 3 wherein said organoaluminum compound is chosen from among dimethylaluminum bromide, diethylaluminum chloride, dioctylaluminum iodide, dieicosylaluminum chloride, ethylaluminum dichloride, dodecylaluminum dibromide, dioctadecylaluminum iodide, ethylaluminum sesquichloride isobutylaluminum sesquibromide, and diethylaluminum ethoxide.

6. A catalyst system useful for producing ethylene polymers comprising as component A a catalyst of claim 1 and as component B an organoaluminum compound having the formula AlR''$_a$X'$_{3-a}$ wherein R'' is hydrogen or an alkyl or aryl group containing from 1 to about 20 carbon atoms, X' is bromine, chlorine, or iodine or an alkoxy group containing from 1 to about 12 carbon atoms, a is an integer of from 1 to 3, and when X' is alkoxy, a is 2 with the molar ratio of component B to component A in a range from about 1:1 to about 1500:1.

7. A catalyst system of claim 6 wherein said organoaluminum compound of component B is chosen from among trimethylaluminum, triethylaluminum, tridodecylaluminum, trieicosylaluminum, triphenylaluminum, diiethylaluminum chloride, dibutylaluminum bromide, methylaluminum dichloride, isopropylaluminum dibromide, dimethylaluminum ethoxide, didodecylaluminum dodecyloxide, and ethylaluminum sesquichloride.

8. A method for producing a catalyst useful in conjunction with an organoaluminum compound for producing ethylene polymers, said method comprising:
   (1) reacting a mixture of a compound of titanium having the formula Ti(OR)$_n$X$_{4-n}$ in which R is selected from among alkyl, cycloalkyl, aryl, and acyl groups and combinations thereof; each group can contain from 1 to about 20 carbon atoms per molecule, n designates 1, 2, 3, or 4; and X is bromide, chloride or iodide and a compound of vanadium having the formula VX$_4$ or VO(OR')$_m$X$_{3-m}$ in which R' is an alkyl group containing from 1 to about 20 carbon atoms, m is 0 to 3 and X is bromide, chloride or iodide with an organoaluminum compound having the formula AlR''$_a$X$_{3-a}$ wherein R'' is hydrogen or an alkyl or aryl group containing from 1 to about 20 carbon atoms, X' is bromine, chlorine, or iodine or an alkoxy group containing from 1 to about 12 carbon atoms, a is an integer of from 1 to 3, and when X' is alkoxy, a is 2 thereby forming a first product and
   (2) contacting said first product with a titanium tetrachloride to produce a second reaction product.

9. A method of claim 8 wherein said titanium and vanadium compounds are mixed prior to contact with said organoaluminum compound.

10. A method of claim 9 wherein a hydrocarbon diluent is admixed with said titanium-vanadium compounds.

11. A method of claim 8 wherein said product mixture is aged before being reduced with said organoaluminum compound.

12. A method of claim 8 wherein titanium tetrachloride is added to the product.

13. A method of claim 8 wherein said product is added to titanium tetrachloride.

14. A method for producing ethylene polymers comprising contacting ethylene under conditions suitable for polymerization with a catalyst comprising the catalyst of claim 1 and an organoaluminum compound.

* * * * *

UNITED STATES PATENT AND TRADEMARK OFFICE
CERTIFICATE OF CORRECTION

PATENT NO. : 4,208,304

DATED : June 17, 1980

INVENTOR(S) : Darryl R. Fahey

It is certified that error appears in the above-identified patent and that said Letters Patent are hereby corrected as shown below:

Column 12, lines 64-67, claim 14 should be deleted.

Signed and Sealed this

Thirteenth Day of January 1981

[SEAL]

Attest:

SIDNEY A. DIAMOND

Attesting Officer

Commissioner of Patents and Trademarks